US009242515B2

(12) United States Patent
Nakazaki

(10) Patent No.: US 9,242,515 B2
(45) Date of Patent: Jan. 26, 2016

(54) PNEUMATIC TIRE WITH SIDE WALL RUN FLAT LINERS

(71) Applicant: The Yokohama Rubber Co., LTD., Minato-ku, Tokyo (JP)

(72) Inventor: Keisuke Nakazaki, Kanagawa (JP)

(73) Assignee: The Yokohama Rubber Co., LTD. (JP)

( * ) Notice: Subject to any disclaimer, the term of this patent is extended or adjusted under 35 U.S.C. 154(b) by 319 days.

(21) Appl. No.: 13/760,136

(22) Filed: Feb. 6, 2013

(65) Prior Publication Data
US 2013/0199688 A1    Aug. 8, 2013

(30) Foreign Application Priority Data

Feb. 8, 2012   (JP) ................................. 2012-025363
Dec. 12, 2012  (JP) ................................. 2012-271758

(51) Int. Cl.
| | |
|---|---|
| B60C 17/00 | (2006.01) |
| B60C 11/00 | (2006.01) |
| B60C 3/04 | (2006.01) |
| B60C 15/06 | (2006.01) |
| B60C 9/28 | (2006.01) |
| B60C 13/00 | (2006.01) |

(52) U.S. Cl.
CPC . B60C 17/00 (2013.01); B60C 3/04 (2013.01); B60C 9/28 (2013.01); B60C 11/0083 (2013.04); B60C 17/0009 (2013.04); B60C 13/003 (2013.01); B60C 2015/061 (2013.04); B60C 2017/0072 (2013.04)

(58) Field of Classification Search
CPC ................ B60C 17/0009; B60C 17/00; B60C 2017/0072; B60C 11/0083; B60C 3/04; B60C 9/28; B60C 2015/061

USPC ......... 152/517, 516, 209.14, 209.1, 454, 546, 152/538
See application file for complete search history.

(56) References Cited

U.S. PATENT DOCUMENTS

| | | | |
|---|---|---|---|
| 3,542,107 A * | 11/1970 | Knight | |
| 4,405,007 A * | 9/1983 | Welter | |
| 4,442,880 A * | 4/1984 | Takahashi | |
| 5,058,646 A * | 10/1991 | Kajikawa et al. | 152/517 X |
| 6,142,204 A * | 11/2000 | Omoteda et al. | 152/517 |
| 6,533,011 B2 * | 3/2003 | Tobino et al. | 152/517 X |
| 6,619,354 B1 * | 9/2003 | Kobayashi et al. | 152/517 |
| 7,086,440 B2 * | 8/2006 | Baran | 152/517 |
| 7,740,037 B2 * | 6/2010 | Yamashita | 152/516 |

(Continued)

FOREIGN PATENT DOCUMENTS

| | | | |
|---|---|---|---|
| JP | 2000309211 A | * | 11/2000 |
| JP | 2007-069890 | | 3/2007 |

(Continued)

*Primary Examiner* — Adrienne C Johnstone
(74) *Attorney, Agent, or Firm* — Thorpe North & Western

(57) ABSTRACT

A pneumatic tire has a belt cross-sectional width BW as a total width in a tire width direction of a belt layer and a distance W1 as a distance in the tire width direction from an edge on the tread portion side of a run flat liner to an edge of the belt layer. The belt cross-sectional width BW and the distance W1 are such that $0.25 \leq W1/(BW/2) \leq 0.45$ is satisfied. A thickness Wr in each of the side wall portions of the pneumatic tire is a thickness in the tire width direction of the run flat liner at a maximum width position, a thickness Ws is a thickness in the tire width direction of a rubber layer at the maximum width position, and the thickness Wr and the thickness Ws are such that $1.2 \leq Wr/Ws \leq 1.9$ is satisfied.

18 Claims, 2 Drawing Sheets

(56) References Cited

U.S. PATENT DOCUMENTS 8,469,071 B2 * 6/2013 Horiuchi
8,499,807 B2 * 8/2013 Shinzawa
8,640,754 B2 * 2/2014 Horiuchi ........................ 152/517
8,851,129 B2 * 10/2014 Yumii et al. ............... 152/517 X
8,905,101 B2 * 12/2014 Horiuchi ............. B60C 17/0009

2010/0193102 A1 * 8/2010 Tsuruta et al.

FOREIGN PATENT DOCUMENTS

JP 2010089762 A * 4/2010
JP 2012096656 A * 5/2012

* cited by examiner

|  | Conventional Example | Working Example 1 | Working Example 2 | Working Example 3 | Working Example 4 | Working Example 5 | Working Example 6 |
|---|---|---|---|---|---|---|---|
| θ1/θ2 | 2.0 | 3.0 | 4.5 | 6.0 | 4.5 | 4.5 | 4.5 |
| Wl/(BW/2) | 0.24 | 0.35 | 0.45 | 0.35 | 0.35 | 0.35 | 0.35 |
| Wr/Ws | 2.9 | 1.2 | 1.5 | 1.9 | 1.4 | 1.4 | 1.4 |
| SDH/SH | 0.50 | 0.53 | 0.60 | 0.68 | 0.57 | 0.57 | 0.57 |
| SWa/SW | 0.75 | 0.65 | 0.69 | 0.73 | 0.70 | 0.70 | 0.70 |
| FLH/SH | 0.38 | 0.30 | 0.30 | 0.30 | 0.12 | 0.20 | 0.27 |
| Rs/Rr | 0.8 | 1.0 | 1.0 | 1.0 | 1.5 | 2.0 | 3.0 |
| Rolling resistance | 100 | 110 | 110 | 100 | 105 | 110 | 105 |
| RF durability | 100 | 100 | 110 | 110 | 110 | 120 | 120 |
| Riding comfort | 100 | 110 | 105 | 100 | 105 | 110 | 100 |
| Steering stability | 100 | 100 | 105 | 105 | 100 | 110 | 110 |

PNEUMATIC TIRE WITH SIDE WALL RUN FLAT LINERS

PRIORITY CLAIM

Priority is claimed to Japan Patent Application Serial No. 2012-025363 and 2012-271758 filed on Feb. 8, 2012 and Dec. 12, 2012.

BACKGROUND

1. Technical Field

The present technology relates to a pneumatic tire.

2. Related Art

Conventionally, run flat tires including a side reinforcing rubber layer on an inner side of a carcass in a side wall portion are known as pneumatic tires (e.g. see Japanese Unexamined Patent Application Publication No. 2007-69890A). This run flat tire has a tire outer surface curvature radius that is configured to be a predetermined curvature radius and, as a result, steering stability when run-flat traveling is ensured and run-flat durability is enhanced while increases in tire weight and declines in riding comfort are suppressed.

However, some run flat tires to be mounted on a vehicle have a run flat liner (side reinforcing rubber layer) with reduced thickness. With such tires, even if the tire outer surface curvature radius is configured as described in Japanese Unexamined Patent Application Publication No. 2007-69890A, in some cases, the effects described above will not be obtained.

In light of this, an object of the present technology is to provide a pneumatic tire by which rolling resistance reduction, run-flat traveling durability enhancement, riding comfort enhancement, and steering stability enhancement can be simultaneously achieved, even in cases where the run flat liner is a predetermined thickness (thinness).

SUMMARY

A pneumatic tire for assembly on a rim of the present technology includes a tread portion, a pair of shoulder portions provided on both sides of the tread portion, a pair of side walls linked respectively to the pair of shoulder portions, and a pair of bead portions linked respectively to the pair of side wall portions. Such a pneumatic tire further includes a carcass layer provided across the pair of bead portions from the tread portion through the pair of shoulder portions and the pair of side wall portions, a belt layer provided outward of the carcass layer in the tread portion, a rubber layer provided outward of the carcass layer and the belt layer, a pair of run flat liners provided inward of the carcass layer in the side wall portions, and an inner liner provided inward of the carcass layer and the run flat liner. In this pneumatic tire, an angle $\theta 1$ is an angle formed by a first connecting line that connects a tire outer circumferential surface on a tire equator line passing through a center point of a tire cross-sectional width and the tire outer circumferential surface in a ground contact edge, and a first straight line extending in a tire width direction from the tire outer circumferential surface on the tire equator line; and an angle $\theta 2$ is an angle formed by a second connecting line that connects the tire outer circumferential surface on the tire equator line and the tire outer circumferential surface on a straight line extending in a tire radial direction through a center point of the first connecting line, and the first straight line. The angle $\theta 1$ and the angle $\theta 2$ are such that $3.0 \leq \theta 1/\theta 2 \leq 6.0$ is satisfied. Additionally, a belt cross-sectional width BW is a total width in the tire width direction of the belt layer; a distance W1 on one side of the tire equator line is a distance in the tire width direction from an edge on the tread portion side of the run flat liner to an edge of the belt layer; and the belt cross-sectional width BW and the distance W1 are such that $0.25 \leq W1/(BW/2) \leq 0.45$ is satisfied. Furthermore, a thickness Wr in each of the side wall portions is a thickness in the tire width direction of the run flat liner at a maximum width position where a tire width is greatest; a thickness Ws in each of the side wall portions is a thickness in the tire width direction of the rubber layer at the maximum width position where the tire width is greatest, and the thickness Wr and the thickness Ws are such that $1.2 \leq Wr/Ws \leq 1.9$ is satisfied.

In this case, preferably, a height SH is a tire cross-sectional height; a height SDH is a height in the tire radial direction from an inner diameter side edge of the bead portion to the maximum width position where the tire width is greatest; and the tire cross-sectional height SH and the height SDH are such that $0.53 \leq SDH/SH \leq 0.68$ is satisfied. Additionally, preferably, a width SW is the tire cross-sectional width; a ground contact width SWa is a width in the tire width direction of the ground contact edge; and the tire cross-sectional width SW and the ground contact width SWa are such that $0.65 \leq SWa/SW \leq 0.73$ is satisfied.

In this case, preferably, each of the bead portions comprises a bead core constituting the core and a bead filler disposed on an outer side in the tire radial direction of the bead core. A height SH is a tire cross-sectional height; a height FLH is a height in the tire radial direction from the inner diameter side edge of the bead portion to an outer diameter side edge of the bead filler; and the tire cross-sectional height SH and the height FLH are such that $0.12 \leq FLH/SH \leq 0.27$ is satisfied. Additionally, preferably, a thickest position is a position in each of the side wall portions where a tire total thickness is greatest, taken on normal line orthogonal to a tire inner circumferential surface; a thickness Rr is a thickness at the thickest position of the run flat liner; a thickness Rs is a thickness at the thickest position of the rubber layer; and the thickness Rr and the thickness Rs are such that $1.5 \leq Rs/Rr \leq 3.0$ is satisfied.

According to the present technology, a pneumatic tire can be provided by which rolling resistance reduction, run-flat traveling durability enhancement, riding comfort enhancement, and steering stability enhancement can be simultaneously achieved, even in cases where the run flat liner is a predetermined thickness (thinness).

BRIEF DESCRIPTION OF THE DRAWINGS

FIG. 2 is a table in which Working Examples of the pneumatic tire according to this embodiment are compared.

DETAILED DESCRIPTION

Figure 1:
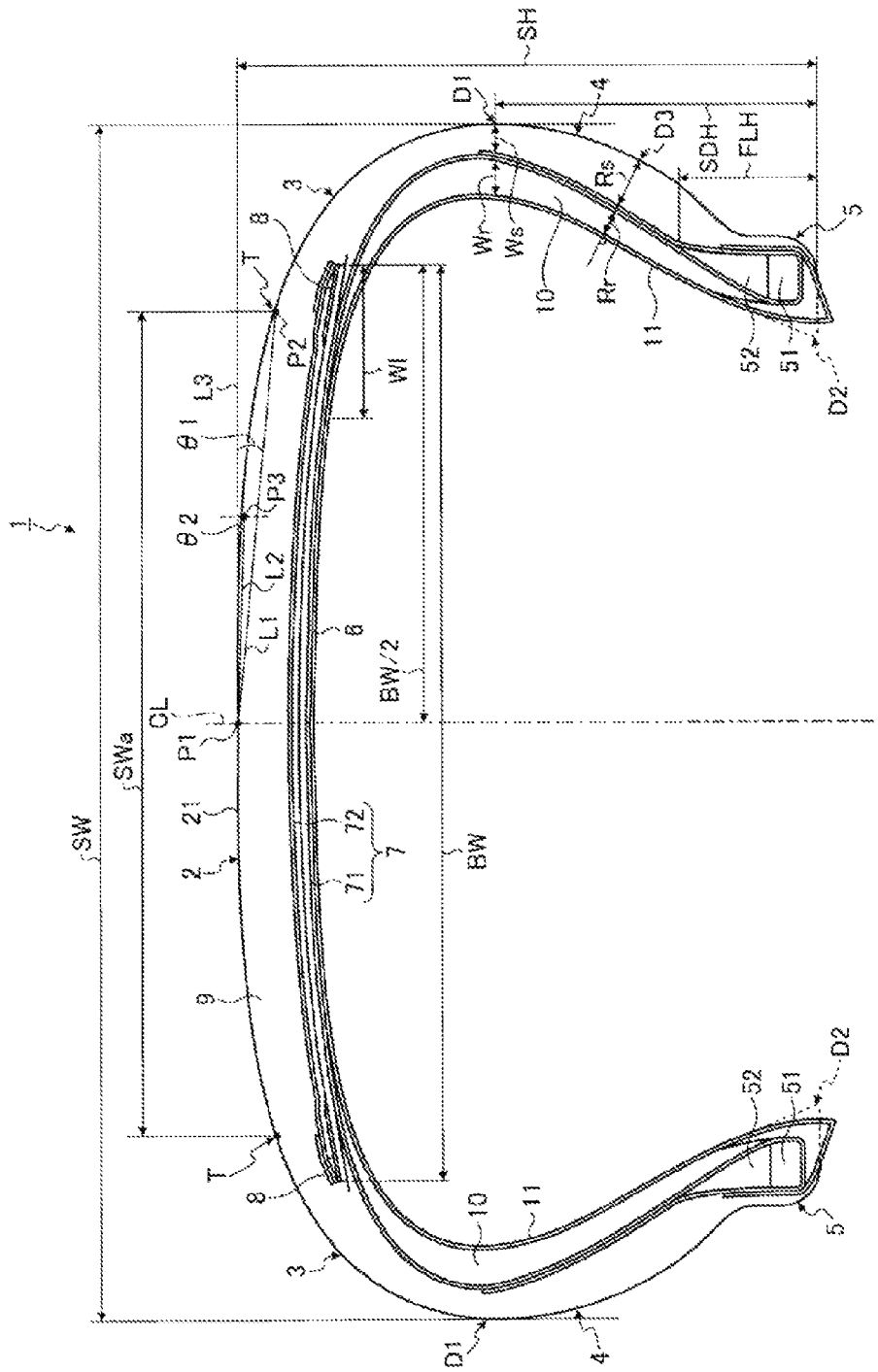
FIG. 1 is a meridian cross-sectional view of a pneumatic tire according to an embodiment.

An embodiment of the present technology is described below in detail based on the drawings. However, the present technology is not limited to these embodiments. The constituents of the embodiment include constituents that can be easily replaced by those skilled in the art and constituents substantially same as the constituents of the embodiment. Furthermore, the multiple Working Examples described in the embodiment can be combined as desired within the scope apparent to a person skilled in the art.

Embodiment

FIG. 1 is a meridian cross-sectional view of a pneumatic tire according to this embodiment. In the following description, "tire radial direction" refers to a direction orthogonal to the rotational axis (not illustrated) of a pneumatic tire 1; "inner side in the tire radial direction" refers to the side facing the rotational axis in the tire radial direction; and "outer side in the tire radial direction" refers to the side distanced from the rotational axis in the tire radial direction. "Tire circumferential direction" refers to a circumferential direction with the rotational axis as a center axis. Additionally, "tire width direction" refers to the direction parallel to the rotational axis; "inner side in the tire width direction" refers to the side facing a tire equatorial plane CL (tire equator line) in the tire width direction; and "outer side in the tire width direction" refers to the side distanced from the tire equatorial plane CL in the tire width direction. "Tire equatorial plane CL" refers to a plane that is orthogonal to the rotational axis of the pneumatic tire 1 and that passes through a center of a tire cross-sectional width (below-described, SW) of the pneumatic tire 1. "Tire cross-sectional width" refers to a width calculated by subtracting a height of a design formed in the surface of the outer side in the tire width direction from a total width of the pneumatic tire 1. "Tire cross-sectional height" (below-described, SH) refers to ½ of a height calculated by subtracting a rim diameter from an outer diameter of the pneumatic tire 1. "Tire equator line" refers to a line along the tire circumferential direction of the pneumatic tire 1 that lies on the tire equatorial plane CL. In this embodiment, "tire equator line" is given the same "CL" reference symbol as that used for the tire equatorial plane.

The pneumatic tire 1 of this embodiment is a run flat tire and is used as a run flat tire for a passenger vehicle.

As illustrated in FIG. 1, the pneumatic tire 1 of this embodiment includes a tread portion 2, a pair of shoulder portions 3 on both sides of the tread portion 2, and a pair of side wall portions 4 and a pair of bead portions 5 continuing sequentially from each of the shoulder portions 3. Additionally, the pneumatic tire 1 includes a carcass layer 6, a belt layer 7, a belt reinforcing layer 8, a rubber layer 9, a run flat liner 10, and an inner liner 11.

The tread portion 2 is formed from a rubber material (tread rubber), is exposed on the outermost side in the tire radial direction of the pneumatic tire 1, and a surface thereof constitutes a profile of the pneumatic tire 1. A tread surface 21 is formed on a peripheral surface of the tread portion 2 or, rather, on a road contact surface that contacts a road surface when traveling. The tread surface 21 has an appropriate form that is determined by the application of the pneumatic tire 1, the vehicle on which the pneumatic tire 1 is to be mounted, and the like. While not explicitly illustrated in the drawings, the tread surface 21 may, for example, be provided with a plurality of main grooves, a plurality of land portions, and a plurality of lug grooves. The main grooves extend along a tire circumferential direction and are straight main grooves that are parallel to a tire equator line CL. The land portions are formed between each of the main grooves by the plurality of main grooves, extend along the tire circumferential direction, and are formed so as to have a rib-like form that is parallel to the tire equator line CL. The lug grooves are provided so as to intersect the main grooves in each of the land portions, and multiply divide the land portions in the tire circumferential direction. Additionally, the lug grooves are formed so as to open to an outermost side in the tire width direction of the tread portion 2, that is, the outer side in the tire width direction. Note that the lug grooves may have a form that communicates with the main grooves or may have a form that does not communicate with the main grooves.

The pair of shoulder portions 3 are constituents that are located on both outer sides in the tire width direction of the tread portion 2. Additionally, the pair of side wall portions 4 are exposed at an outermost side in the tire width direction of the pneumatic tire 1. The pair of bead portions 5 each include a bead core 51 and a bead filler 52. The bead core 51 is formed by winding a steel wire (bead wire) in a ring-like manner. The bead filler 52 is a rubber material that is disposed in space formed by ends of the carcass layer 6 in the tire width direction being folded up at a position of the bead core 51.

The ends of the carcass layer 6 in the tire width direction are folded over the pair of bead cores 51 from the inner side in the tire width direction to the outer side in the tire width direction, and the carcass layer 6 is stretched in a toroidal shape in the tire circumferential direction to form the framework of the tire. The carcass layer 6 is constituted by a plurality of carcass cords (not illustrated) juxtaposed in the tire circumferential direction along the tire meridian direction having a given angle with respect to the tire circumferential direction, and covered by a coating rubber. The carcass cords are formed from organic fibers (e.g. polyester, rayon, nylon, or the like). At least one layer of this carcass layer 6 is provided.

The belt layer 7 has a multi-layer structure where at least two layers (belts 71 and 72) are stacked; is disposed on an outer side in the tire radial direction that is the periphery of the carcass layer 6, in the tread portion 2; and covers the carcass layer 6 in the tire circumferential direction. The belts 71 and 72 are constituted by a plurality of cords (not illustrated) juxtaposed at a predetermined angle with respect to the tire circumferential direction (e.g. from 20 degrees to 30 degrees), and covered by a coating rubber. The cords are formed from steel or organic fibers (e.g. polyester, rayon, nylon, or the like). Moreover, the overlapping belts 71 and 72 are disposed so that the cords thereof mutually intersect.

The belt reinforcing layer 8 is disposed on the outer side in the tire radial direction that is the periphery of the belt layer 7, and covers the belt layer 7 in the tire circumferential direction. The belt reinforcing layer 8 is constituted by a plurality of cords (not illustrated), juxtaposed in the tire width direction and substantially parallel (e.g. ±5 degrees) to the tire circumferential direction, which are covered by a coating rubber. The cords are formed from steel or organic fibers (e.g. polyester, rayon, nylon, or the like). The belt reinforcing layer 8 illustrated in FIG. 1 is disposed so as to cover end portions in the tire width direction of the belt layer 7. The configuration of the belt reinforcing layer 8 is not limited to that described above. While not explicitly illustrated in the drawings, a configuration may be used where the belt reinforcing layer 8 is disposed so as to cover an entirety of the belt layer 7. Alternatively, for example, a configuration may be used where the belt reinforcing layer 8 has two reinforcing layers, where the belt reinforcing layer 8 is formed so that the reinforcing layer on the inner side in the tire radial direction is longer in the tire width direction than the belt layer 7 and disposed so as to cover the entirety of the belt layer 7, and the reinforcing layer on the outer side in the tire radial direction is disposed so as only to cover the end portions in the tire width direction of the belt layer 7. Alternatively, for example, a configuration may be used where the belt reinforcing layer 8 has two reinforcing layers, where each of the reinforcing layers is disposed so as only to cover the end portions in the tire width direction of the belt layer 7. In other words, the belt reinforcing layer 8 overlaps with at least the end portions in the tire width direction of the belt layer 7. Additionally, the belt reinforcing layer 8 is provided by winding band-like (e.g. with a width of 10 mm) strip material in the tire circumferential direction.

The rubber layer 9 is formed outward of the carcass layer 6, the belt layer 7, and the belt reinforcing layer 8, and is provided across the bead portions 5 from the tread portion 2 through the shoulder portions 3 and the side wall portions 4. Thus, a portion of the rubber layer 9 constitutes the tread portion 2.

The run flat liner 10 is disposed inward (on an inner side in the tire width direction) of the carcass layer 6 in the side wall portion 4, and is provided throughout the tire circumferential direction. The run flat liner 10 has a crescent shape in which a first end portion narrows to a tip from the side wall portion 4 through the shoulder portion 3 toward the tread portion 2, and a second end portion narrows to a tip from the side wall portion 4 toward the bead portion 5.

The inner liner 11 is formed inward of the carcass layer 6 and the run flat liner 10, and is provided across the bead portions 5 from the tread portion 2 through the shoulder portions 3 and the side wall portions 4.

The pneumatic tire 1 configured as described above has a cross-sectional shape (profile) that satisfies the following various parameters. Descriptions of the various parameters are as follows. The various parameters are: $\theta 1/\theta 2$, Wl/(BW/2), Wr/Ws, SDH/SH, SWa/SW, FLH/SH, and Rs/Rr.

First, a description of the $\theta 1/\theta 2$ parameter shall be given. $\theta 1/\theta 2$ is a parameter that defines an angle that the tire circumferential surface takes (drops) inward in the tire radial direction from the tread portion 2 toward the shoulder portions 3. First, point P1 is a tire outer circumferential surface on the tire equator line CL that passes through a center of the tire cross-sectional width SW. Point P2 is the tire outer circumferential surface at one ground contact edge T. A first connecting line L1 is a line that connects the point P1 and the point P2. The "ground contact edge T" refers to both outermost edges in the tire width direction of a region in which the tread surface 21 of the tread portion 2 of the pneumatic tire 1 contacts the road surface when the pneumatic tire 1 is assembled on a regular rim and filled with regular inner pressure and 70% of a regular load is applied, and continues in the tire circumferential direction. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. With the exception of the definition of the ground contact edge T, the various parameters of the pneumatic tire 1 refer to parameters in a cross-sectional shape (profile) state where the pneumatic tire 1 is assembled on a regular rim and inflated to the regular internal pressure (50 kPa).

A first straight line L3 is a straight line extending in the tire width direction of the pneumatic tire 1 with respect to the tire outer circumferential surface on the tire equator line CL. In cases where the tire width direction (the axial direction of the rotational axis of the tire) is horizontal, the first straight line L3 is a horizontal line extending in the horizontal direction. An angle $\theta 1$ is an angle formed by the first connecting line L1 and the first straight line L3. Point P3 is the tire outer circumferential surface on a straight line extending in the tire radial direction through a center point of the first connecting line L1. A second connecting line L2 is a line that connects the point P1 and the point P3, and an angle $\theta 2$ is an angle formed by the second connecting line L2 and the first straight line L3.

A relationship between the angle $\theta 1$ and the angle $\theta 2$ is such that $3.0 \le \theta 1/\theta 2 \le 6.0$ is satisfied. In this case, an optimal value of $\theta 1/\theta 2$ is 4.5.

Next, a description of the Wl/(BW/2) parameter shall be given. Wl/(BW/2) is a parameter that defines an implanted amount of the run flat liner 10 that is implanted between the belt layer 7 and the inner liner 11. First, a belt cross-sectional width BW is a total width in the tire width direction of the belt layer 7. That is, in cases where the belt layer 7 is constituted by belts 71 and 72, the belt cross-sectional width BW is a width between ends of the belts 71 and 72 located outermost on a first side in the tire width direction and ends of the belts 71 and 72 located outermost on a second side in the tire width direction. Additionally, a distance Wl on a first side (the right side in the drawings) in the tire width direction, demarcated by the tire equator line CL, is a distance in the tire width direction from an edge on the tread portion 2 side of the run flat liner 10 to a first edge of the belt layer 7.

A relationship between the belt cross-sectional width BW and the distance Wl satisfies $0.25 \le Wl/(BW/2) \le 0.45$. In this case, an optimal value of Wl/(BW/2) is 0.35.

Next, a description of the Wr/Ws parameter shall be given. Wr/Ws is a parameter that defines a thickness of the run flat liner 10. First, a thickness Wr in each of the side wall portions 4 is a thickness in the tire width direction of the run flat liner 10 at a maximum width position D1 where a tire width is greatest. That is, the thickness Wr is the thickness from the outer side of the inner liner 11 to the inner side of the carcass layer 6. The tire width at the maximum width position D1 is the tire cross-sectional width SW. Additionally, a thickness Ws in each of the side wall portions 4 is a thickness in the tire width direction of the rubber layer 9 at the maximum width position D1 where the tire width is greatest. That is, the thickness Ws is a thickness from the outer side of the carcass layer 6 to the tire outer circumferential surface.

A relationship between the thickness Wr and the thickness Ws satisfies $1.2 \le Wr/Ws \le 1.9$. In this case, an optimal value of Wr/Ws is 1.4.

Next, a description of the SDH/SH parameter shall be given. SDH/SH is a parameter that defines the maximum width position D1 in the tire radial direction. First, a height SH is a tire cross-sectional height. A lower end position D2 is a position at an edge on the inner side in the tire radial direction of the bead portion 5, known as the bead base line. A height SDH is a height in the tire radial direction from the lower end position D2 to the maximum width position D1. Note that in FIG. 1, the lower end position D2 is positioned on the inner side in the tire radial direction of the rim assembled pneumatic tire 1 and, therefore, is a position at the dashed line portion which indicates the lower end position D2 of the pneumatic tire 1, abutted against a regular rim.

A relationship between the tire cross-sectional height SH and the height SDH satisfies $0.53 \le SDH/SH \le 0.68$. In this case, an optimal value of SDH/SH is 0.57.

Next, a description of the SWa/SW parameter shall be given. SWa/SW is a parameter that defines a ground contact width ratio (ground contact width proportion) with respect to the tire cross-sectional width SW. First, a width SW is a tire cross-sectional width. A ground contact width SWa is a width in the tire width direction between ground contact edges T.

A relationship between the tire cross-sectional width SW and the ground contact width SWa satisfies $0.65 \le SWa/SW \le 0.73$. In this case, an optimal value of SWa/SW is 0.7.

Next, a description of the FLH/SH parameter shall be given. FLH/SH is a parameter that defines a height in the tire radial direction of the bead filler 52. As described above, the height SH is the tire cross-sectional height. A height FLH is a height in the tire radial direction from the lower end position D2 described above to an edge on the outer side in the tire radial direction of the bead filler 52.

A relationship between the tire cross-sectional height SH and the height FLH satisfies $0.12 \leq FLH/SH \leq 0.27$. In this case, an optimal value of FLH/SH is 0.20.

Next, a description of the Rs/Rr parameter shall be given. Rs/Rr is a parameter that defines the thickness of the run flat liner 10. A thickest position D3 is a position in each of the side wall portions 4 where a tire total thickness is greatest, taken on normal line orthogonal to a tire inner circumferential surface. A thickness Rr is a thickness of the run flat liner 10 on a line normal to the thickest position D3. That is, the thickness Rr is the thickness from the outer side of the inner liner 11 to the inner side of the carcass layer 6. Additionally, a thickness Rs is a thickness of the rubber layer 9 on a line normal to the thickest position D3. That is, the thickness Rs is a thickness from the outer side of the carcass layer 6 to the tire outer circumferential surface.

A relationship between the thickness Rr and the thickness Rs satisfies $1.5 \leq Rs/Rr \leq 3.0$. In this case, an optimal value of Rs/Rr is 2.0.

As described above, according to the configuration of this embodiment, a cross-sectional shape of the pneumatic tire 1 is such that $3.0 \leq \theta1/\theta2 \leq 6.0$, $0.25 \leq Wl/(BW/2) \leq 0.45$, and $1.2 \leq Wr/Ws \leq 1.9$ are satisfied. As a result, buckling when run-flat traveling can be suppressed, and durability when run-flat traveling can be enhanced while maintaining steering stability because the pneumatic tire 1 satisfies $3.0 \leq \theta1/\theta2 \leq 6.0$. Additionally, riding comfort can be enhanced while maintaining durability when run-flat traveling because the pneumatic tire 1 satisfies $0.25 \leq Wl/(BW/2) \leq 0.45$. Furthermore, the thickness can be reduced while maintaining the durability of the run flat liner 10 and, as a result, riding comfort can be enhanced because the pneumatic tire 1 satisfies $1.2 \leq Wr/Ws \leq 1.9$. Additionally, rolling resistance can be reduced as a result of the weight reduction and the like of the run flat liner 10.

Additionally, according to the configuration of this embodiment, the cross-sectional shape of the pneumatic tire 1 is such that $0.53 \leq SDH/SH \leq 0.68$ and $0.65 \leq SWa/SW \leq 0.73$ can be satisfied. As a result, riding comfort can be enhanced and rolling resistance can be reduced because springing properties of the pneumatic tire 1 can be reduced. In addition, the volume of the rubber material (the rubber layer 9) in the tread portion 2 in the ground contact width SWa can be reduced because the ground contact width SWa can be shortened and, as a result, the rolling resistance can be further reduced.

Additionally, according to the configuration of this embodiment, the cross-sectional shape of the pneumatic tire 1 is such that $0.12 \leq FLH/SH \leq 0.27$ and $1.5 \leq Rs/Rr \leq 3.0$ can be satisfied. As a result, durability when run-flat traveling can be enhanced because heat build-up in the pneumatic tire 1 at the edge on the outer side in the tire radial direction of the bead filler 52 can be suppressed. Moreover, sufficient thickness of the rubber layer 9 at the portion between the side wall portion 4 and the bead portion 5 can be ensured and, therefore, durability when run-flat traveling can be enhanced while maintaining riding comfort and rolling resistance.

EXAMPLES

Next, while referencing FIG. 2, Working Examples 1 to 6, in which the embodiment described above is applied, are described. Additionally, various performances including rolling resistance reduction, run-flat traveling durability (RF durability), riding comfort, and steering stability in the Working Examples 1 to 6 are compared. FIG. 2 is a table in which Working Examples of the pneumatic tire according to this embodiment are compared. Note that a pneumatic tire 1 of the Conventional Example (for comparison) is a pneumatic tire 1 in which configurations of the various parameters recited in this embodiment are outside the ranges described. Herein, evaluations of the various performances of the pneumatic tires 1 of the Conventional Example and the Working Examples 1 to 6 are performed according to the following evaluation conditions.

Evaluation conditions: A pneumatic tire 1 having a size of 215/50RF17 was used and this pneumatic tire 1 was mounted on a front-wheel drive vehicle. The rolling resistance was evaluated in accordance with ISO standards. Additionally, the run-flat traveling durability was evaluated in accordance with ECE30 standards. Furthermore, sensory evaluation was used for evaluating the riding comfort and the steering stability.

The cross-sectional shape of the pneumatic tire 1 according to the Conventional Example had a configuration such that $\theta1/\theta2=2.0$, $Wl/(BW/2)=0.24$, $Wr/Ws=2.9$, $SDH/SH=0.50$, $SWa/SW=0.75$, $FLH/SH=0.38$, and $Rs/Rr=0.8$ were satisfied.

The cross-sectional shape of the pneumatic tire 1 according to the Working Example 1 had a configuration such that $\theta1/\theta2=3.0$, $Wl/(BW/2)=0.35$, $Wr/Ws=1.2$, $SDH/SH=0.53$, $SWa/SW=0.65$, $FLH/SH=0.30$, and $Rs/Rr=1.0$ were satisfied.

The cross-sectional shape of the pneumatic tire 1 according to the Working Example 2 had a configuration such that $\theta1/\theta2=4.5$, $Wl/(BW/2)=0.45$, $Wr/Ws=1.5$, $SDH/SH=0.60$, $SWa/SW=0.69$, $FLH/SH=0.30$, and $Rs/Rr=1.0$ were satisfied.

The cross-sectional shape of the pneumatic tire 1 according to the Working Example 3 had a configuration such that $\theta1/\theta2=6.0$, $Wl/(BW/2)=0.35$, $Wr/Ws=1.9$, $SDH/SH=0.68$, $SWa/SW=0.73$, $FLH/SH=0.30$, and $Rs/Rr=1.0$ were satisfied.

The cross-sectional shape of the pneumatic tire 1 according to the Working Example 4 had a configuration such that $\theta1/\theta2=4.5$, $Wl/(BW/2)=0.35$, $Wr/Ws=1.4$, $SDH/SH=0.57$, $SWa/SW=0.70$, $FLH/SH=0.12$, and $Rs/Rr=1.5$ were satisfied.

The cross-sectional shape of the pneumatic tire 1 according to the Working Example 5 had a configuration such that $\theta1/\theta2=4.5$, $Wl/(BW/2)=0.35$, $Wr/Ws=1.4$, $SDH/SH=0.57$, $SWa/SW=0.70$, $FLH/SH=0.20$, and $Rs/Rr=2.0$ were satisfied.

The cross-sectional shape of the pneumatic tire 1 according to the Working Example 6 had a configuration such that $\theta1/\theta2=4.5$, $Wl/(BW/2)=0.35$, $Wr/Ws=1.4$, $SDH/SH=0.57$, $SWa/SW=0.70$, $FLH/SH=0.27$, and $Rs/Rr=3.0$ were satisfied.

The various performances of the pneumatic tire 1 of the Conventional Example are set to 100 and the various performances of the pneumatic tires 1 of Working Examples 1 to 6 are compared. Note that with the various performances, higher scores indicate enhanced performance. That is, for the rolling resistance, higher scores indicate greater reduction of the rolling resistance. For the run-flat traveling durability, higher scores indicate enhanced durability. Additionally, for the riding comfort, higher scores indicate enhanced riding comfort. Moreover, for the steering stability, higher scores indicate enhanced steering stability.

As shown in FIG. 2, with the pneumatic tire 1 of Working Example 1, the rolling resistance score was 110, the RF durability score was 100, the riding comfort score was 110, and the steering stability score was 100. From this, compared with the Conventional Example, reduced rolling resistance and enhanced riding comfort were confirmed.

Additionally, with the pneumatic tire 1 of Working Example 2, the rolling resistance score was 110, the RF durability score was 110, the riding comfort score was 105, and the steering stability score was 105. From this, compared with the Conventional Example, reduced rolling resistance, enhanced RF durability, enhanced riding comfort, and enhanced steering stability were confirmed.

Additionally, with the pneumatic tire 1 of Working Example 3, the rolling resistance score was 100, the RF durability score was 110, the riding comfort score was 100, and the steering stability score was 105. From this, compared with the Conventional Example, enhanced RF durability and enhanced steering stability were confirmed.

Additionally, with the pneumatic tire 1 of Working Example 4, the rolling resistance score was 105, the RF durability score was 110, the riding comfort score was 105, and the steering stability score was 100. From this, compared with the Conventional Example, reduced rolling resistance, enhanced RF durability, and enhanced riding comfort were confirmed.

Additionally, with the pneumatic tire 1 of Working Example 5, the rolling resistance score was 110, the RF durability score was 120, the riding comfort score was 110, and the steering stability score was 110. From this, compared with the Conventional Example, reduced rolling resistance, enhanced RF durability, enhanced riding comfort, and enhanced steering stability were confirmed.

Additionally, with the pneumatic tire 1 of Working Example 6, the rolling resistance score was 105, the RF durability score was 120, the riding comfort score was 100, and the steering stability score was 110. From this, compared with the Conventional Example, reduced rolling resistance, enhanced RF durability, and enhanced steering stability were confirmed.

As described above, it was confirmed that the various performances were enhanced the most with the pneumatic tire 1 of Working Example 5, and that the enhancements of the various performances were achieved simultaneously. Additionally, it was confirmed from the results of comparing the Conventional Example and Working Example 2 that by satisfying the $3.0 \leq \theta1/\theta2 \leq 6.0$, $0.25 \leq W1/(BW/2) \leq 0.45$, and $1.2 \leq Wr/Ws \leq 1.9$ parameters (values for which vary greatly), reduction of the rolling resistance, enhancement of the run-flat traveling durability, enhancement of the riding comfort, and enhancement of the steering stability can be achieved simultaneously.

What is claimed is:

1. A pneumatic tire for assembly on a rim comprising a tread portion, a pair of shoulder portions provided on both sides of the tread portion, a pair of side walls linked respectively to the pair of shoulder portions, and a pair of bead portions linked respectively to the pair of side wall portions; the pneumatic tire further comprising:
    a carcass layer provided across the pair of bead portions from the tread portion through the pair of shoulder portions and the pair of side wall portions,
    a belt layer provided outward of the carcass layer in the tread portion,
    a rubber layer forming an outer surface of the tread portion, of each shoulder portion, of each side wall, and of each bead portion,
    a pair of run flat liners provided inward of the carcass layer in the side wall portions, and
    an inner liner provided inward of the carcass layer and the run flat liner; wherein
    an angle $\theta1$ is an angle formed by a first connecting line that connects a tire outer circumferential surface on a tire equator line passing through a center point of a tire cross-sectional width and the tire outer circumferential surface in a ground contact edge, and a first straight line extending in a tire width direction from the tire outer circumferential surface on the tire equator line,
    an angle $\theta2$ is an angle formed by a second connecting line that connects the tire outer circumferential surface on the tire equator line and the tire outer circumferential surface on a straight line extending in a tire radial direction through a center point of the first connecting line, and the first straight line,
    the angle $\theta1$ and the angle $\theta2$ are such that $3.0 \leq \theta1/\theta2 \leq 6.0$ is satisfied,
    a belt cross-sectional width BW is a total width in the tire width direction of the belt layer,
    a distance W1 on one side of the tire equator line is an overlap distance in the tire width direction from an edge on the tread portion side of the run flat liner to an edge of the belt layer,
    the belt cross-sectional width BW and the distance W1 are such that $0.25 \leq W1/(BW/2) \leq 0.45$ is satisfied,
    a thickness Wr in each of the side wall portions is a thickness in the tire width direction of the run flat liner at a maximum width position where a tire width is greatest,
    a thickness Ws in each of the side wall portions is a thickness in the tire width direction of the rubber layer at the maximum width position where the tire width is greatest, and
    the thickness Wr and the thickness Ws are such that $1.2 \leq Wr/Ws \leq 1.9$ is satisfied.

2. The pneumatic tire according to claim 1, wherein: a height SH is a tire cross-sectional height,
    a height SDH is a height in the tire radial direction from bead base line to the maximum width position where the tire width is greatest,
    the tire cross-sectional height SH and the height SDH are such that $0.53 \leq SDH/SH \leq 0.68$ is satisfied,
    a width SW is the tire cross-sectional width,
    a ground contact width SWa is a width in the tire width direction of the ground contact edge, and
    the tire cross-sectional width SW and the ground contact width SWa are such that $0.65 \leq SWa/SW \leq 0.73$ is satisfied.

3. The pneumatic tire according to claim 2, wherein the tire cross-sectional height SH and the height SDH are such that $SDH/SH=0.57$ is satisfied.

4. The pneumatic tire according to claim 2, wherein the tire cross-sectional width SW and the ground contact width SWa are such that $SWa/SW=0.7$ is satisfied.

5. The pneumatic tire according to claim 2, wherein: each of the bead portions comprises a bead core constituting the core and a bead filler disposed on an outer side in the tire radial direction of the bead core,
    a height SH is a tire cross-sectional height,
    a height FLH is a height in the tire radial direction from the base line to an outer diameter side edge of the bead filler,
    the tire cross-sectional height SH and the height FLH are such that $0.12 \leq FLH/SH \leq 0.27$ is satisfied,
    a thickest position is a position in each of the side wall portions where a tire total thickness is greatest, taken on normal line orthogonal to a tire inner circumferential surface,
    a thickness Rr is a thickness of the run flat liner at the thickest position, a thickness Rs is a thickness of the rubber layer at the thickest position, and the thickness Rr and the thickness Rs are such that $1.5 \leq Rs/Rr \leq 3.0$ is satisfied.

6. The pneumatic tire according to claim 5, wherein the belt cross-sectional width BW and the distance Wl are such that Wl/(BW/2)=0.35 is satisfied.

7. The pneumatic tire according to claim 6, wherein the thickness Wr and the thickness Ws are such that Wr/Ws=1.4 is satisfied.

8. The pneumatic tire according to claim 7, wherein the tire cross-sectional height SH and the height SDH are such that SDH/SH=0.57 is satisfied.

9. The pneumatic tire according to claim 8, wherein the tire cross-sectional width SW and the ground contact width SWa are such that SWa/SW=0.7 is satisfied.

10. The pneumatic tire according to claim 9, wherein the tire cross-sectional height SH and the height FLH are such that FLH/SH=0.20 is satisfied.

11. The pneumatic tire according to claim 10, wherein the thickness Rr and the thickness Rs are such that Rs/Rr=2.0 is satisfied.

12. The pneumatic tire according to claim 1, wherein: each of the bead portions comprises a bead core constituting the core and a bead filler disposed on an outer side in the tire radial direction of the bead core, a height SH is a tire cross-sectional height, a height FLH is a height in the tire radial direction from a bead base line to an outer diameter side edge of the bead filler, the tire cross-sectional height SH and the height FLH are such that $0.12 \leq FLH/SH \leq 0.27$ is satisfied, a thickest position is a position in each of the side wall portions where a tire total thickness is greatest, taken on normal line orthogonal to a tire inner circumferential surface, a thickness Rr is a thickness of the run flat liner at the thickest position, a thickness Rs is a thickness of the rubber layer at the thickest position, and the thickness Rr and the thickness Rs are such that $1.5 \leq Rs/Rr \leq 3.0$ is satisfied.

13. The pneumatic tire according to claim 12, wherein the tire cross-sectional height SH and the height FLH are such that FLH/SH=0.20 is satisfied.

14. The pneumatic tire according to claim 12, wherein the thickness Rr and the thickness Rs are such that Rs/Rr=2.0 is satisfied.

15. The pneumatic tire according to claim 12, wherein the belt cross-sectional width BW and the distance Wl are such that Wl/(BW/2)=0.35 is satisfied.

16. The pneumatic tire according to claim 12, wherein the thickness Wr and the thickness Ws are such that Wr/Ws=1.4 is satisfied.

17. The pneumatic tire according to claim 1, wherein the belt cross-sectional width BW and the distance Wl are such that Wl/(BW/2)=0.35 is satisfied.

18. The pneumatic tire according to claim 1, wherein the thickness Wr and the thickness Ws are such that Wr/Ws=1.4 is satisfied.

* * * * *